(12) United States Patent
Wu et al.

(10) Patent No.: US 9,460,212 B2
(45) Date of Patent: Oct. 4, 2016

(54) SYSTEM AND METHOD FOR PERSONALIZED SEARCH

(75) Inventors: Xiaoyuan Wu, Shanghai (CN); Alvaro Bolivar, San Francisco, CA (US); Wenyan Hu, Shanghai (CN); Qiang Wang, Shanghai (CN)

(73) Assignee: PAYPAL, INC., San Jose, CA (US)

( * ) Notice: Subject to any disclaimer, the term of this patent is extended or adjusted under 35 U.S.C. 154(b) by 1085 days.

(21) Appl. No.: 12/327,522

(22) Filed: Dec. 3, 2008

(65) Prior Publication Data
US 2010/0138413 A1 Jun. 3, 2010

(51) Int. Cl.
*G06F 17/30* (2006.01)
(52) U.S. Cl.
CPC .............................. *G06F 17/30867* (2013.01)
(58) Field of Classification Search
CPC ................................................ G06F 17/30867
USPC .................................................. 707/732–734
See application file for complete search history.

(56) References Cited

U.S. PATENT DOCUMENTS

| | | | |
|---|---|---|---|
| 5,642,502 A * | 6/1997 | Driscoll | |
| 5,761,662 A * | 6/1998 | Dasan | |
| 6,012,053 A * | 1/2000 | Pant et al. | |
| 6,385,619 B1 * | 5/2002 | Eichstaedt et al. | 707/748 |
| 6,654,735 B1 * | 11/2003 | Eichstaedt et al. | 707/749 |
| 2003/0074409 A1 * | 4/2003 | Bentley | 709/206 |
| 2005/0071328 A1 * | 3/2005 | Lawrence | 707/3 |
| 2005/0198559 A1 * | 9/2005 | Fujiwara | 715/500 |
| 2006/0206480 A1 * | 9/2006 | Heidloff et al. | 707/6 |
| 2006/0224552 A1 * | 10/2006 | Riezler et al. | 707/1 |

* cited by examiner

*Primary Examiner* — Joshua Bullock
(74) *Attorney, Agent, or Firm* — Maschoff Brennan

(57) ABSTRACT

A system and method for personalized search. The system includes a search engine that receives search input from a user and a user identification and generates a search result based on the search input; and a profiling engine to gather profile data, generate a user profile associated with a user, and rank the search result personalized to the specific user using the user profile.

20 Claims, 5 Drawing Sheets

SYSTEM AND METHOD FOR PERSONALIZED SEARCH

TECHNICAL FIELD

An embodiment relates generally to the technical field of searching and, in one example embodiment, to a system and method to process a data search request.

BACKGROUND

A search engine is a tool that identifies data items in a data source based on a data search request that is entered by a user. The search engine utilizes keywords or other types of constraints entered by the user to identify data items that are of interest to the user. Sometimes a search engine returns large search results that are diverse and unorganized; the different data items in the search result are mixed together without any order. In such instances, the large unorganized search result may not be very helpful to the user because the user may need to carefully examine the entire search result in order to find relevant data items.

BRIEF DESCRIPTION OF THE DRAWINGS

An embodiment of the present invention is illustrated by way of example and not limitation in the figures of the accompanying drawings, in which like references indicate similar elements and in which.

DETAILED DESCRIPTION

Example methods and systems for a personalized search are described. In the following description, for purposes of explanation, numerous specific details are set forth in order to provide a thorough understanding of example embodiments. It will be evident, however, to one skilled in the art that the present invention may be practiced without these specific details.

In general, embodiments described below feature a system that responds to a user that has entered a data search request. The system responds by performing a search and ranking the search results according to context data, historical activity of a user, demographic data of a user, or any combination thereof. In addition, the search results can be further ranked by a weighted personalization score. The ranked search result would, among other things, allow users to find what they really want with more ease.

Platform Architecture

Figure 1:
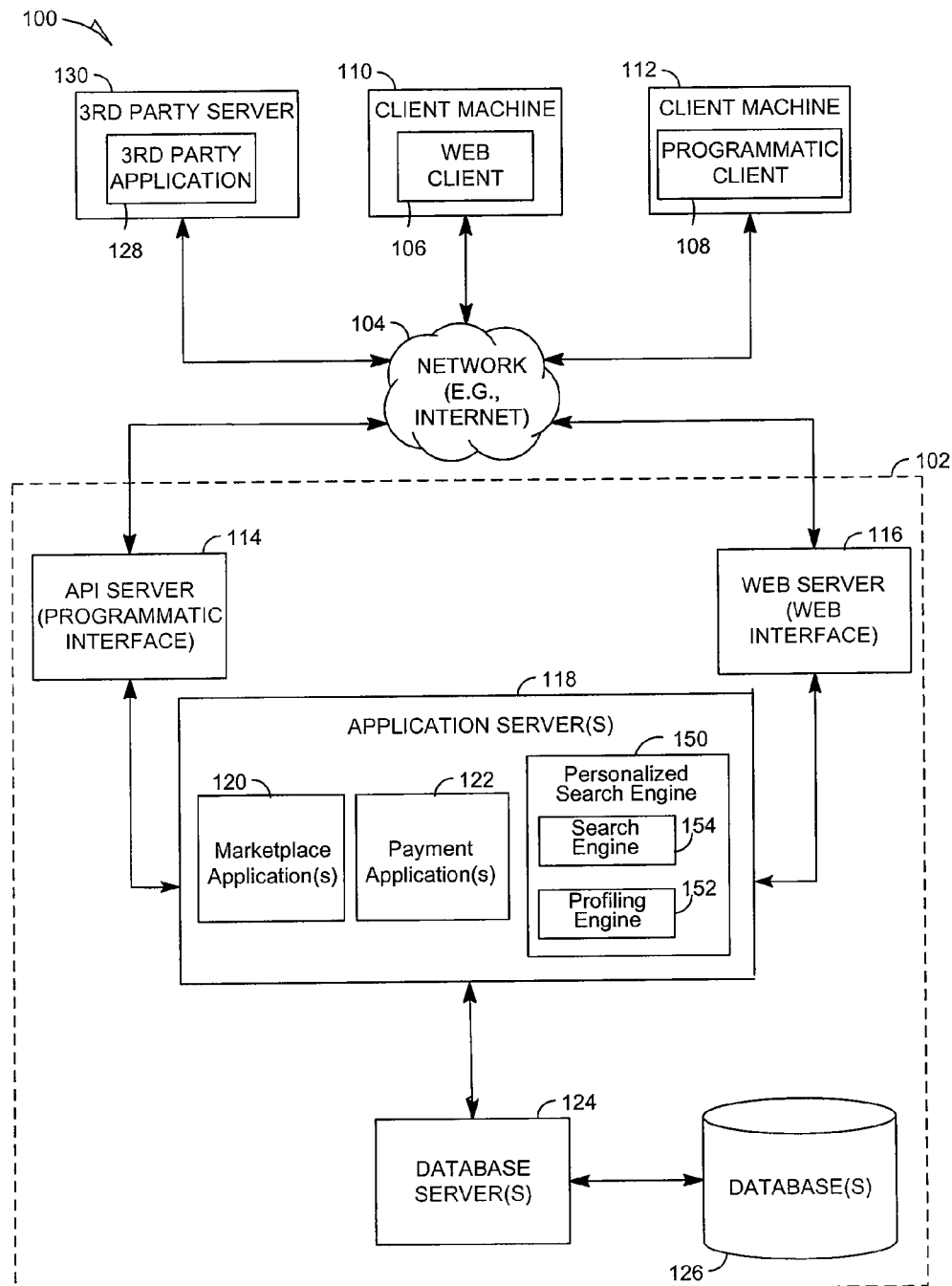
FIG. 1 illustrates a network diagram depicting a system, according to one example embodiment of the present invention.

FIG. 1 illustrates a network diagram of a client-server system 100, within which one example embodiment may be deployed. A networked system 102, in the example form of a network-based marketplace or publication system, provides server-side functionality, via a network 104 (e.g., the Internet or Wide Area Network (WAN)) to one or more client systems. FIG. 1 illustrates, for example, a web client 106 (e.g., a browser, such as the Internet Explorer browser developed by Microsoft Corporation of Redmond, Wash. State), and a programmatic client 108 executing on respective client machines 110 and 112.

An Application Program Interface (API) server 114 and a web server 116 are coupled to, and provide programmatic and web interfaces respectively to, one or more application servers 118. The application servers 118 can host a plurality of applications including one or more marketplace applications, payment applications, and search applications. The application servers 118 are, in turn, shown to be coupled to one or more database servers 124 that facilitate access to one or more databases 126.

The marketplace applications 120 may provide a number of marketplace functions and services to users that access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Search applications can provide users with the means to quickly find information or data that the user is looking for. For example, the application servers 118 can host a personalized search engine 150 that performs a search based on user input and ranks the results according to context data, historical activity of a user, demographic data of a user, or any combination thereof. In addition, the search results can be further ranked by a weighted personalization score. The personalized search engine 150 may further utilize other applications hosted by the application servers 118 such as a profiling engine 152 and a search engine 154. Alternatively, the personalized search engine 150 may utilize its own profiling engine 152 and search engine 154.

Further, while the system 100 shown in FIG. 1 employs a client-server architecture, the present invention is of course not limited to such an architecture, and could equally well find application in a distributed, or peer-to-peer architecture system, for example. The various marketplace and payment applications could also be implemented as standalone software programs, which do not necessarily have networking capabilities.

The web client 106 accesses the various applications via the web interface supported by the web server 116. Similarly, the programmatic client 108 accesses the various services and functions provided by the applications via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace or payment functions that are supported by the relevant applications of the networked system 102.

Marketplace Applications

Figure 2:
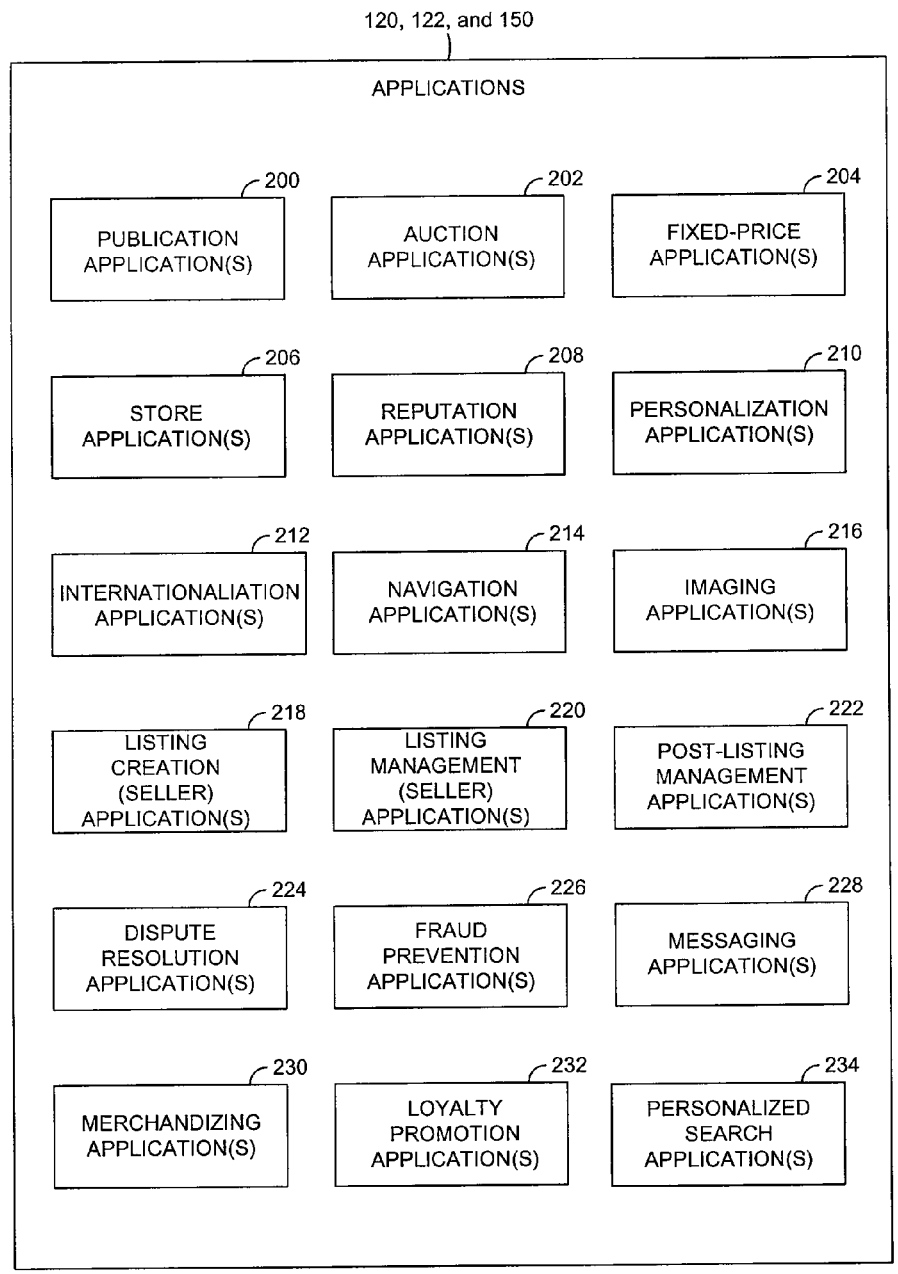
FIG. 2 illustrates a block diagram of an example embodiment of multiple network and marketplace applications, which are provided as part of the network-based marketplace.

FIG. 2 is a block diagram illustrating multiple applications 120, 122, and 150 that, in one example embodiment, are provided as part of the networked system 102. The applications 120, 122, and 150 may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access one or more databases 126 via the database servers 126.

The networked system 102 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 120 are shown to include at least one publication application 200 and one or more auction applications 202 which support auction-format listing and price setting mechanisms (e.g., English, Dutch, Vickrey, Chinese, Double, Reverse auctions etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives and features that are specific and personalized to a relevant seller.

Reputation applications 208 allow users that transact, utilizing the networked system 102, to establish, build and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user, for example through feedback provided by other transaction partners, to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page at which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions. A version of the networked system 102 may be customized for the United Kingdom, whereas another version of the networked system 102 may be customized for the United States. Each of these versions may operate as an independent marketplace, or may be customized (or internationalized) presentations of a common underlying marketplace. The networked system 102 may accordingly include a number of internationalization applications 212 that customize information (and/or the presentation of information) by the networked system 102 according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application) may enable key word searches of listings published via the networked system 102. A browse application may allow users to browse various category, catalogue, or inventory data structures according to which listings may be classified within the networked system 102. Various other navigation applications may be provided to supplement the search and browsing applications.

Related to the navigation of the networked system are the personalized search applications 234 that can perform a search based on user input and rank the results according to context data, historical activity of a user, demographic data of a user, or any combination thereof. In addition, the search results can be further ranked by a weighted personalization score.

In order to make listings available via the networked system 102, as visually informing and attractive as possible, the marketplace applications 120 may include one or more imaging applications 216 utilizing which users may upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers conveniently to author listings pertaining to goods or services that they wish to transact via the networked system 102, and listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. One or more post-listing management applications 222 also assist sellers with a number of activities that typically occur post-listing. For example, upon completion of an auction facilitated by one or more auction applications 202, a seller may wish to leave feedback regarding a particular buyer. To this end, a post-listing management application 222 may provide an interface to one or more reputation applications 208, so as to allow the seller conveniently to provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102, such messages for example advising users regarding the status of listings at the networked system 102 (e.g., providing "outbid" notices to bidders during an auction process or to provide promotional and merchandising information to users). Respective messaging applications 228 may utilize any of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 230 support various merchandising functions that are made available to sellers to enable sellers to increase sales via the networked system 102. The merchandising applications 80 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotions applications 232. For example, a buyer may earn loyalty or promotions points for each transaction established and/or concluded with a particular seller, and be offered a reward for which accumulated loyalty points can be redeemed.

Figure 3:
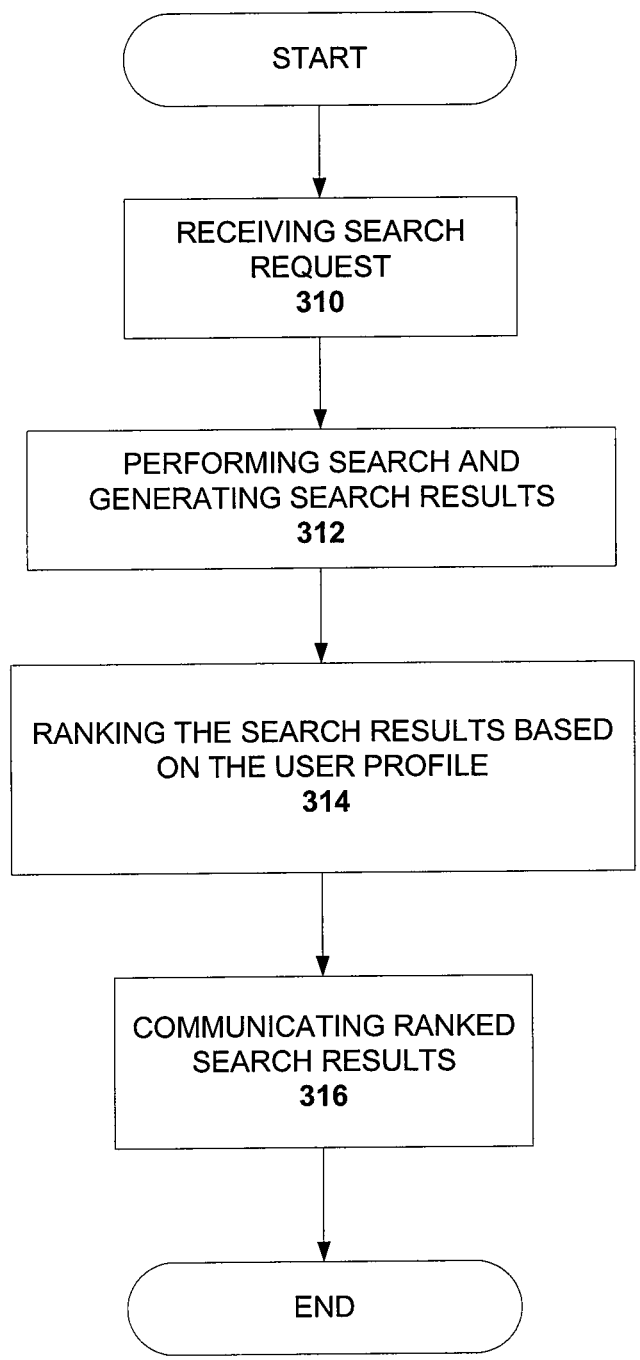
FIG. 3 illustrates a flowchart of one possible method for performing a personalized search.

FIG. 3 illustrates a block diagram disclosing a method for implementing a personalized search engine 150 according to an example embodiment of the present disclosure. At stage 310, the client machine 110 or 112 communicates a search request with a search input to the personalized search engine 150. At stage 312, the personalized search engine 150 performs the search using a search engine 154 based on the search parameters of the search request. The results of the search are then communicated to the profiling engine 152. Next, at stage 314, The profiling engine 152 then ranks the results of the search using the user profile generated by the profiling engine 152. In one example embodiment, if a user profile has not yet been created, the profiling engine 152 may rank the results of the search using a default ranking system. When the search result is ranked, the ranked results are returned to the client machine 110 or 112 at stage 316. In an example embodiment, the search results can also be filtered before the profiling engine ranks them.

A user using the personalized search engine 150 can be identified by a user identification such as, but not limited to, a login name. In another example embodiment, this user identification can be a cookie placed on the client machine 110 or 112.

In an example embodiment, the profiling engine 152 generates a user profile by tracking user data from the applications hosted on the application servers 118. These applications include the marketplace applications 120, payment applications 120, as well as the personalized search engine 150 itself. Tracking is possible because the applications are communicatively coupled to each other and to various data sources so as to allow information to be passed between the applications or so as to allow the applications to share and access common data. The applications may furthermore access one or more databases 126 via database servers 124. In other embodiments, the profiling engine 152 generates a user profile by tracking user data from various applications not hosted on the application servers 118 of the networked system 102. For example, the profiling engine may be able to access data across domains on other networked systems.

In one example embodiment, the user data can be stored on one or more databases 126 via database servers 124. In another example embodiment, some or all of the user data could also be stored on cookies stored on the client machine 110 or 112.

The data tracked by the profiling engine 152 may include a history of the user's activities with the networked system 102. This data can include that last x number of searches made, the last x keywords used, the last x links clicked, the last x items or products watched, the last x products watched, the last x products or items viewed, the last x items bid on, the last x sellers bid from, the last x items purchased, average price of purchases made, favorite sellers, favorite searches, and so on and so forth. The categories of the items or products accessed, purchased, viewed, watched, or bid can also be tracked. Context data such as, but not limited to, the current page the user is on or manual input such as user responses to surveys or recommendation pages can also be stored and used to update the user profiles. In another example embodiment, the history of the user's activities does not have to be with the networked system 102, but can be with other networked systems because the profile data can be stored on the client machine 110 or 112.

Other embodiments may allow a user to modify their profile to input their preferences themselves, modify specific portions of their profile, reset their profile, or delete their profile. Furthermore, a user may also be given the option of having the system not track the user's personal profile at all.

To illustrate the use of such a user profile, example embodiments are provided. Generally, when a user communicates a search request to a generic search engine with a keyword as the search input, items belonging to several categories may be returned to the user without any order. For example, if a user searched for the keyword "css" on a generic search engine, items belonging to several categories ("Books," "Computers and Networking," "Cameras and Photo," "Musical Instruments," etc.) may be returned to the user without any order. Using the personalized search engine 150, the profiling engine 152 can compute the user's interest by analyzing the categories of the items watched, viewed, purchased, bid on, etc. Once the profiling engine 152 determines the preferred categories, it ranks the search results according to these categories. Thus, the user is returned a ranked search result with items matching their interest at the top. In one example embodiment, if a user has been recently viewing, biding, watching, or searching for items in the "Computer and Networking" category, the ranked search result given to the user will have items matching the "css" search input and belonging to the "Computer and Networking" category at the top.

The data tracked by the profiling engine 152 can also include data that indicates whether a customer is satisfied with a purchase. Some examples of such data might be, repeat buying from the same sellers, positive feedback for sellers, negative feedback, or whether a user has contacted customer support. In one example embodiment, the profiling engine 152 will rank items sold by sellers that have received indication of user customer satisfaction higher than those without indicia of user customer satisfaction.

The data tracked by the profiling engine 152 can further include demographic data such as, but not limited to, a user's age, sex, profession, marital status, number of children, location, income, etc. This information can be used in a variety of ways. In one example embodiment, a user's interest can be computed using interests of other users with similar demographic data. In another example embodiment, a user's location can be used to estimate shipping costs and shipping time such that items with lower shipping costs and shipping times will be ranked higher.

In another example embodiment, user aspects, or personalized information, are also tracked by the profiling engine 152. User aspects are information about users that can be obtained by analyzing the characteristics of items bought, viewed, watched, etc. by the user or through user input such as surveys or feedback. Items can be ranked higher if they have characteristics that match the known user aspects for the given user. For example, if a user bought a shirt, the profiling engine 152 would track the characteristics of the shirt such as, but not limited to, the size, color, price range, or brand. Over time, the profiling engine 152 would be able to analyze the information and come up with a preferred size, color, brand, or price range for a user. Then, if the same user searches for a shirt or jacket, the profiling engine could rank the items that matched the preferred size, color, brand, or price range higher than items that do not.

In one example embodiment, ranking is done by putting an item with a highest "BestMatchScore" at the top. A BestMatchScore of each item may be calculated as the aggregate score of several independent weighted feature scores. In one embodiment, the BestMatchScore of an item can be calculated with a formula similar to: BestMatchScore=$\Sigma w_i f_i$, where $f_i$ is an individual feature score and $w_i$ is the weight assigned to that feature score. A feature score can be determined from any of the available data known about a user. Examples of feature scores include, but are not limited to, keyword desirability (the likelihood that the item is the item desired based on the query, obtained from aggregate data from all users who made similar queries), category matches (whether the item's category matches the preferred category of the user as described above), seller desirability (whether the seller of the item is desired based on their ranking or user's experience with them), shipping costs (how much the item will cost to ship from the seller location to the user location), and user aspect score (whether the particular item has characteristics that match the user aspect data we have on the particular user).

Figure 4:
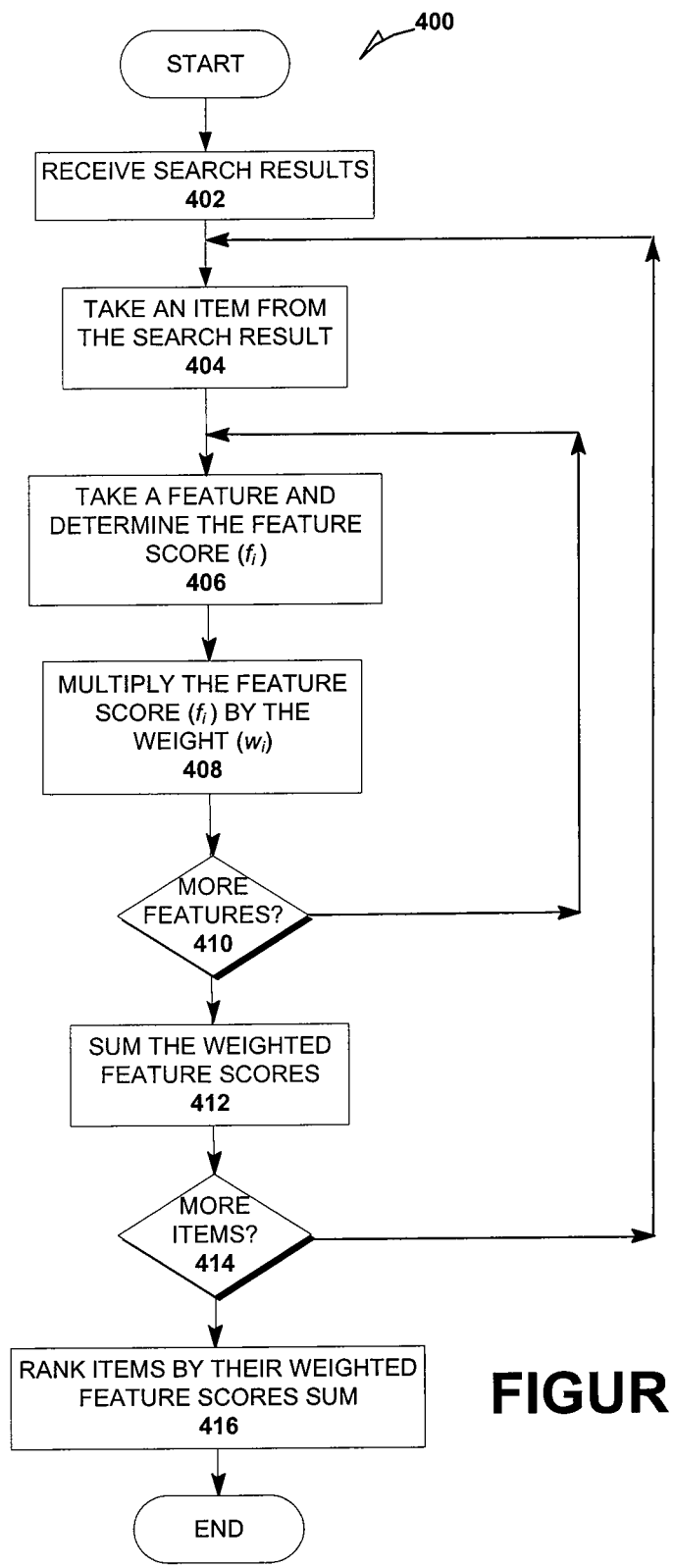
FIG. 4 illustrates a flowchart of one possible method for ranking search results.

FIG. 4 illustrates a flowchart depicting a computer implemented method 400, according to one embodiment, that may be used to rank the search results. At stage 402 the profiling engine 152 receives the search results from a search engine 154. For each item in the search result (stage 404), the profiling engine 152 determines a feature score for a particular feature in stage 406. Then, in stage 408, each feature score is multiplied by the appropriate weight. In stage 410, if there are features that have not been processed, stages 406 and 408 are repeated for those features. At stage 412, the weighted feature scores for each feature are added together. This is done for all items in the search results (stage 414) as long as there is no filtering of the search result requested. Finally, at stage 416, the search results are ranked according to the sum of their weighted feature scores.

It will be appreciated by those skilled in the art that the order of the stages in FIG. 4 may be rearranged. For example for each item in the search results, all the feature scores may be determined first, then each may be multiplied by the appropriate weight.

In an example embodiment, the keyword desirability score can be determined by tracking the keywords or items clicked, viewed, bid on, or how long a user stayed on the page for each query made by users. Over time, the profiling engine 152 would be able to determine for a given query, what the probability is that a user will bid on, click, or view the item. The more likely it is that a user will click, view, or bid on an item, the higher the keyword desirability score it will have.

In another example embodiment, the personalization score, or user aspect score, can be determined by how closely an item's characteristics match the personal data, or user aspect data, known about the particular user.

In a related example embodiment user aspects can be chosen or added on to existing sets of user aspect data by tracking, for a given category, characteristics that users filter searches by and how often they filter the searches by it. For example, when users search for shirts (which can be in the clothing/shoes/accessories category), the profiling engine 152 can track the fact that users will filter the search results by size 80% of the time and color 20% of the time. If the percentage of time that users filter search results by is over a threshold percentage, the profiling engine can keep track of those characteristics. In another related example embodiment, items can be ranked according how often users filter by that characteristic. For example, even without filtering, a user searching for a shirt can be presented a ranked search result with the items corresponding to the correct size and color coming first, then the correct size and another color (because size at 80% filtering is more important than color at 20% filtering), and finally all other items that match the query.

In an example embodiment, the weight assigned to the personalization/user aspect score can be either constant or varied based on the query being made or the category of the query being made. In one example embodiment, categories that do not have much personalization data or variables will have a low personalization/user aspect weight or maybe even a zero weight (personalization/user aspect feature is turned off) where as a category with a lot of personalization or user aspect data will have a higher weight. In another example embodiment, categories where personalization and user aspects are important, such as for clothing, shoes, and accessories, the weight will be greater.

In another example embodiment, the personalization/user aspect feature weight is determined on a query basis. For example, if a user searches for "iPod Nano 8gb" the profiling engine 152 may determine that personalization is not a big factor because, for example, there aren't many user aspect variables that correspond (maybe only color) or the importance of the variables is minimal, for example, if the keyword desirability score, shipping costs, category match, and seller desirability outweigh the importance of personalization. If this is the case, the personalization/user aspect feature weight will be assigned a low value or possibly be turned off for this query.

In an example embodiment, the personalized search engine 150 can also be implemented with a merchandizing engine. For example, if a user searches for "Madonna Tickets," the user can be presented with the regular search results or ranked search results, as well as things that the user may want. For example, if one of the user's preferred categories is clothing, shoes, and accessories, Madonna T-shirts may also be included in the user's search results. Furthermore, these T-shirts may also share characteristics with the user's user aspects such as size and favorite color(s).

In another example embodiment, the personalized search engine 150 can be implemented with an advertising engine. For example, Toyota can pay for advertisements to be shown when a user searches for the keyword "Ford." If a user searches for "Ford," and in his previous searches has searched "hybrid" or "hybrid" is in the user's personalization information/user aspects for the car category, then the user may be presented with the regular search results or ranked search results, as well as a Toyota advertisement for a Toyota Prius Hybrid Car instead of a default Toyota advertisement.

Figure 5:
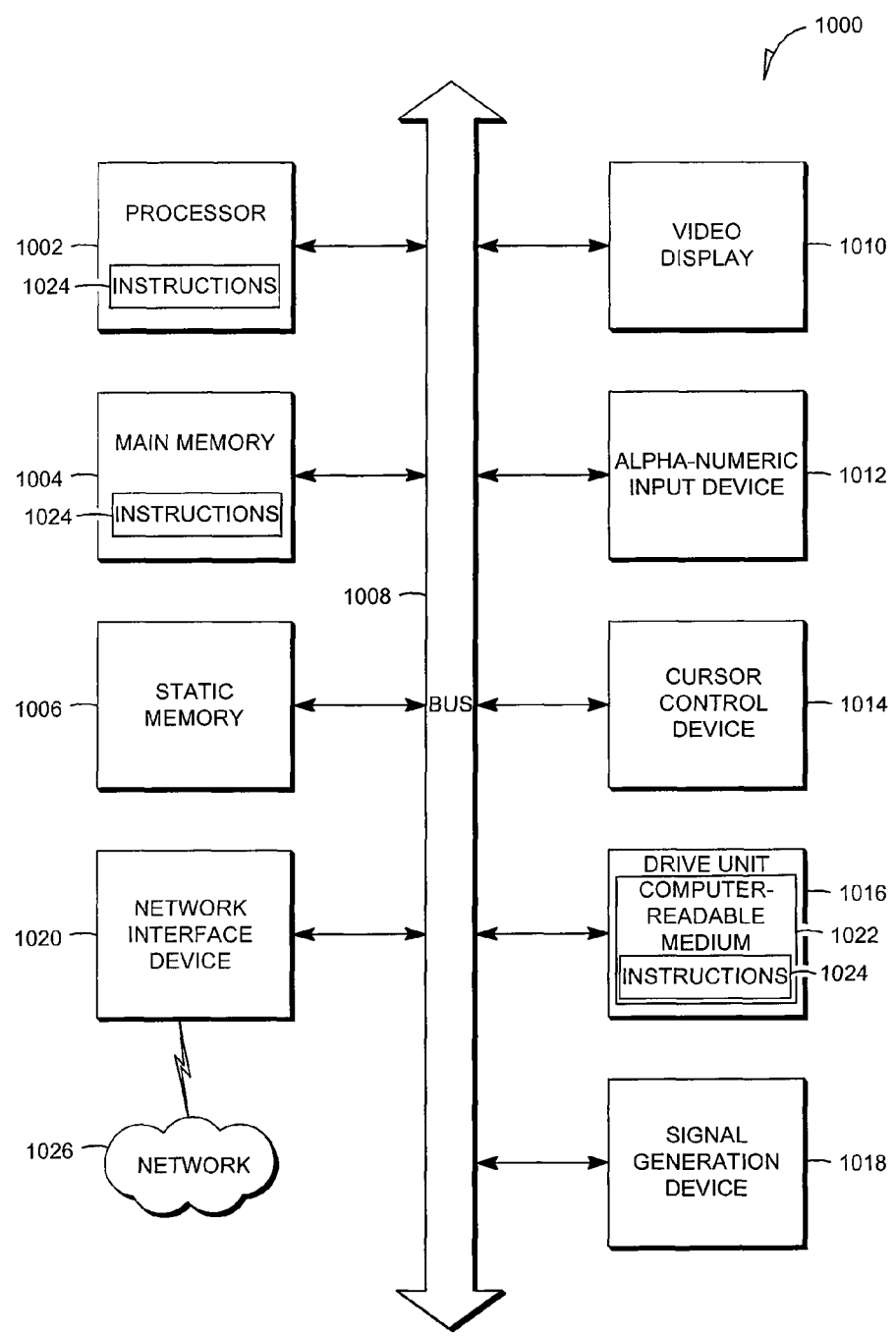
FIG. 5 illustrates a block diagram of a machine that may be used to implement aspects of the invention, according to one embodiment.

FIG. 5 shows a diagrammatic representation of a machine in the example form of a computer system 1000 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU) a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a cursor control device 1014 (e.g., a mouse), a disk drive unit 1016, a signal generation device 1018 (e.g., a speaker) and a network interface device 1020.

The disk drive unit 1016 includes a machine-readable medium 1022 on which is stored one or more sets of instructions (e.g., software 1024) embodying any one or more of the methodologies or functions described herein. The software 1024 may also reside, completely or at least partially, within the main memory 1004 and/or within the processor 1002 during execution thereof by the computer system 1000, the main memory 1004 and the processor 1002 also constituting machine-readable media.

The software 1024 may further be transmitted or received over a network 1026 via the network interface device 1020.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and system for a personalized search have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method for providing search results on a search engine, the method comprising:
   gathering a plurality of profile data;
   generating a user profile associated with a user identification using the plurality of profile data, wherein the user profile comprises a plurality of weight values with each weight value of the plurality of weight values associated with a corresponding feature category of a plurality of feature categories, wherein the weight value for each of the feature categories is based on an amount of personalization data of the plurality of profile data associated with the corresponding feature category; receiving a search input from a user and the user identification;
   generating a plurality of feature scores, each feature score associated with one of the plurality of feature categories based on the search input; and
   creating a ranked search result personalized to the specific user using the user profile, the creating of the ranked search result comprising:
      identifying a user preferred category for the user based on the user profile and the search input from the user;
      identifying the plurality of feature scores;

identifying the weight values for each of the plurality of feature scores;

determining each of the plurality of feature scores for each of the plurality of search result items;

determining a total score for each of the plurality of search result items based on the feature scores for each of the plurality of search result items and the weights for each of the plurality of feature scores;

ranking the plurality of search result items based on the total score; and determining a first feature category of the plurality of feature categories comprising a keyword desirability category, wherein each feature score associated with the keyword desirability category is based on a likelihood that a particular search result is a desired item based on the search input and a set of search results obtained from aggregate data from users who made similar queries.

2. The method of claim 1, wherein the plurality of profile data includes a history of the user's activities.

3. The method of claim 1, wherein the plurality of profile data includes a user's personal information.

4. The method of claim 3, wherein the user's personal information includes user aspect information.

5. The method of claim 4, wherein creating a ranked search result personalized to the specific user using the user profile further comprises:

identifying a plurality of characteristics for each of the plurality of search result items; and ranking the plurality of search result items based on the similarity between the plurality of characteristics for each of the plurality of search result items and the user aspect information.

6. The method of claim 1, wherein the plurality of profile data includes user satisfaction information.

7. The method of claim 1, said method further comprising filtering the search result.

8. The method of claim 1, wherein creating a ranked search result personalized to the specific user using the user profile further comprises:

identifying a category for each of the plurality of search result items; and ranking the plurality of search result items based on the similarity between the search result item category and the user preferred category.

9. The method of claim 1, wherein creating a ranked search result personalized to the specific user using the user profile further comprises:

identifying a plurality of user preferred categories for the user based on the user profile and the search input from the user;

wherein the plurality of user preferred categories are ranked based on the user profile;

identifying a category for each of the plurality of search result items; and ranking the plurality of search result items based on the similarity between the search result item category and the plurality of ranked user preferred categories.

10. The method of claim 1 wherein a second feature category of the plurality of feature categories comprises a category match, wherein each feature score associated with the category match is based on whether the particular search result is associated with a preferred category of the user as determined from the profile data.

11. The method of claim 10 wherein a third feature category of the plurality of feature categories comprises a seller desirability category, wherein each feature score associated with the seller desirability category is based on whether a seller of the particular search result is desired based on a seller ranking or a user experience ranking of the seller from the profile data.

12. The method of claim 11 wherein a fourth feature category of the plurality of feature categories comprises a user aspect category, wherein each feature score associated with the user aspect category is based on whether the particular search result is associated with a set of characteristics matching preferred user aspect characteristics from the profile data.

13. The method of claim 12 wherein a first weight value of the plurality of weight values associated with a fifth feature category is set to 0 based on an absence of personalization data for the fifth feature category in the plurality of profile data.

14. A system for providing search results on a search engine, the system comprising:

a search engine:
  to receive a search input from a user and a user identification; and
  to generate a search result comprising a plurality of search result items based on the user input from the user; and a profiling engine:
to gather a plurality of profile data;
to generate a user profile associated with the user identification using the plurality of profile data, wherein the user profile comprises a plurality of weight values with each weight value of the plurality of weight values associated with a corresponding feature category of a plurality of feature categories, wherein the weight value for each of the feature categories is based on an amount of personalization data of the plurality of profile data associated with the corresponding feature category;
to identify a plurality of feature scores for each of the plurality of feature categories;
to determine each of the plurality of feature scores for each of the plurality of search result items;
to determine a total score for each of the plurality of search result items based on the feature scores for each of the plurality of search result items and the weight values for each of the plurality of feature scores;
to rank the plurality of search result items based on the total score; and to determine a first feature category of the plurality of feature categories comprising a keyword desirability category, wherein each feature score associated with the keyword desirability category is based on a likelihood that a particular search result is a desired item based on the search input and a set of search results obtained from aggregate data from users who made similar queries.

15. The system of claim 14, wherein the profiling engine is to:

identify a category for each of the plurality of search result items; and rank the plurality of search result items based on the similarity between the search result item category and the user preferred category.

16. The system of claim 14, wherein the profiling engine is to:

identify a plurality of user preferred categories for the user based on the user profile and the search input from the user;

wherein the plurality of user preferred categories are ranked based on the user profile; identify a category for each of the plurality of search result items; and rank the plurality of search result items based on the similarity between the search result item category and the plurality of ranked user preferred categories.

17. The system of claim 14, wherein the profiling engine is to:

identify a plurality of characteristics for each of the plurality of search result items; and rank the plurality of search result items based on the similarity between the plurality of characteristics for each of the plurality of search result items and the user aspect information.

18. A system to provide search results, the system comprising:

first means:
to receive a search input from a user and a user identification; and
to generate a search result comprising a plurality of search result items based on the user input; and second means:
to gather a plurality of profile data;
to generate a user profile associated with the user identification using the plurality of profile data, wherein the user profile comprises a plurality of weight values with each weight value of the plurality of weight values associated with a corresponding feature category of a plurality of feature categories, wherein the weight value for each of the feature categories is based on an amount of personalization data of the plurality of profile data associated with the corresponding feature category;
to identify a plurality of feature scores for each of the plurality of feature categories;
for each feature category, to determine the feature score for each of the plurality of search result items;
to determine a total score for each of the plurality of search result items based on the feature scores for each of the plurality of search result items and the weight value for each of the plurality of feature scores;
to rank the plurality of search result items based on the total score; and
to determine a first feature category of the plurality of feature categories comprising a keyword desirability category, wherein each feature score associated with the keyword desirability category is based on a likelihood that a particular search result is a desired item based on the search input and a set of search results obtained from aggregate data from users who made similar queries.

19. The system of claim 18 wherein a second feature category of the plurality of feature categories comprises a user aspect category, wherein each feature score associated with the user aspect category is based on whether the particular search result is associated with a set of characteristics matching preferred user aspect characteristics from the profile data; and a first weight value of the plurality of weight values associated with a fifth feature category is set to 0 based on an absence of personalization data for the fifth feature category in the plurality of profile data.

20. A non-transitory machine-readable medium for storing a sequence of instructions that, when executed by a machine, cause the machine to perform operations comprising:

gathering a plurality of profile data;

generating a user profile associated with a user identification using the plurality of profile data, wherein the user profile comprises a plurality of weight values with each weight value of the plurality of weight values associated with a corresponding feature category of a plurality of feature categories, wherein the weight value for each of the feature categories is based on an amount of personalization data of the plurality of profile data associated with the corresponding feature category;

receiving a search input from a user and the user identification;

generating a plurality of feature scores, each feature score associated with one of the plurality of feature categories based on the search input;

identifying a plurality of feature scores for the plurality of feature categories;

determining each of the plurality of feature scores for each of the plurality of search result items;

determining a total score for each of the plurality of search result items based on the feature scores for each of the plurality of search result items and the weight value for each of the plurality of feature scores;

ranking the plurality of search result items based on the total score; and determining a first feature category of the plurality of feature categories comprising a keyword desirability category, wherein each feature score associated with the keyword desirability category is based on a likelihood that a particular search result is a desired item based on the search input and a set of search results obtained from aggregate data from users who made similar queries.

* * * * *